United States Patent [19]

Do

[11] Patent Number: 5,093,957
[45] Date of Patent: Mar. 10, 1992

[54] COMPRESSION FITTING FOR USE IN A TWO-SIDED HONEYCOMB PANEL

[75] Inventor: Hien D. Do, Pinellas Park, Fla.

[73] Assignee: ATR International, Inc., Clearwater, Fla.

[21] Appl. No.: 726,859

[22] Filed: Jul. 8, 1991

[51] Int. Cl.⁵ .......................... B65D 55/00; E04C 2/34
[52] U.S. Cl. ............................................ 16/2; 52/806
[58] Field of Search .................... 16/2; 411/82; 52/806

[56] References Cited

U.S. PATENT DOCUMENTS

| | | | |
|---|---|---|---|
| 2,700,172 | 1/1955 | Rohe | 16/2 |
| 2,957,196 | 10/1960 | Kreider | 16/2 |
| 2,967,593 | 1/1961 | Cushman | 189/34 |
| 3,056,852 | 10/1962 | Sachs | 174/153 |
| 3,091,795 | 6/1963 | Budwig | 16/2 |
| 3,296,765 | 1/1967 | Rohe | 52/617 |
| 3,977,146 | 8/1976 | Wiley | 52/617 |
| 4,902,180 | 2/1990 | Gauron | 411/82 |

Primary Examiner—Robert L. Spruill
Assistant Examiner—Carmine Cuda
Attorney, Agent, or Firm—Herbert W. Larson

[57] ABSTRACT

A top and bottom disk with central bores axially aligned for receipt of a through bolt fastener. The disks have descending and ascending integral cylindrical tubes respectively. The descending top disk tube has a side wall vertical channel leading to an eccentric hole in the top disk at one end. The inner diameter of the top disk cylindrical tube is slightly larger than the outer diameter of the bottom disk cylindrical tube and receives the bottom disk tube in axial alignment within a through hole in a two-sided honeycomb panel. Ridges on a surface of each disk, in contact with a honeycomb panel side, seal the disk in place after epoxy is inserted into the eccentric hole in the top disk.

5 Claims, 2 Drawing Sheets

COMPRESSION FITTING FOR USE IN A TWO-SIDED HONEYCOMB PANEL

BACKGROUND OF THE INVENTION

1. Field of the Invention

This invention relates to honeycomb panel fasteners. More particularly, it refers to a pair of axially-mated cylindrical tubes descending from annular disks embedded on opposite surface layers of a honeycomb panel.

2. Description of the Prior Art

Grommet type fasteners and spacers for use in honeycomb panels are well known, as set forth in U.S. Pat. Nos. 4,901,395; 2,700,172; 2,967,593 and 2,957,196. In addition, grommets formed from two complementary elements pressed from opposite sides through an opening in a panel are known from U.S. Pat. No. 3,091,795. In the prior art, there are problems relating to proper alignment in the panels, variation in thickness of the panels and ease of installation. An improved compression fitting for use in a two-sided honeycomb panel is needed.

SUMMARY OF THE INVENTION

I have invented an axially-mated compression fitting that is easily mounted, adjusts to different thickness in panels and is consistently aligned within a two-sided honeycomb panel for receipt of thru-bolt fasteners.

My compression fitting has two oppositely facing annular disk components, each having a central bore and an integral cylindrical tube descending from the disk. The two components are axially-mated together from each side of the honeycomb panel. A small hole in one disk allows for the insertion of an epoxy into the honeycomb panel to bind the two disks in place.

The top disk has a series of retainer rings on a bottom surface, a vent discontinuity on an edge of the disk, and an eccentric hole for receipt of the epoxy. The descending cylindrical tube is slightly larger in inside diameter than the outside diameter of the bottom disk cylindrical tube to receive the end portion of the bottom disk cylindrical tube in axial alignment.

BRIEF DESCRIPTION OF THE DRAWINGS

The invention may be best understood by those having ordinary skill in the art by reference to the following detailed description, when considered in conjunction with the accompanying drawings in which.

DETAILED DESCRIPTION OF THE INVENTION

Figure 1:
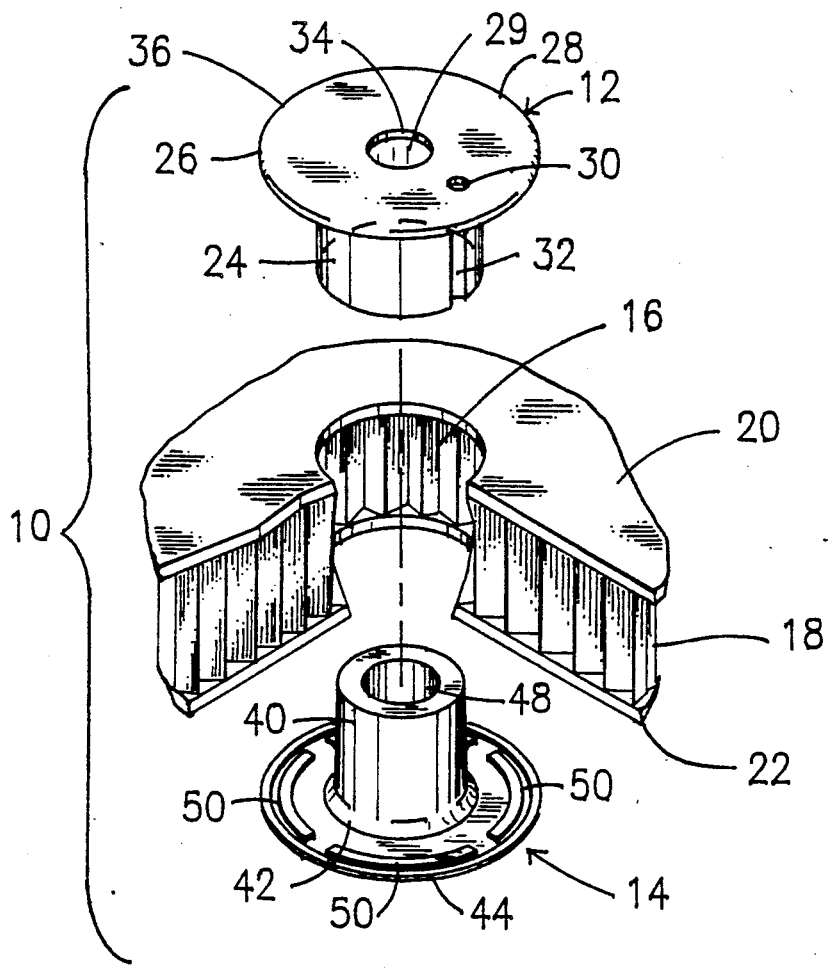
FIG. 1 is an exploded view of a compression fitting of the invention seated in a honeycomb panel.
Figure 2:
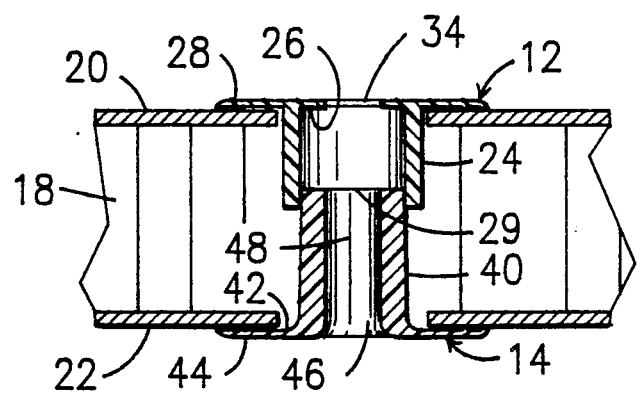
FIG. 2 is a cross-sectional view of the compression fitting seated in a honeycomb panel.
Figure 3:
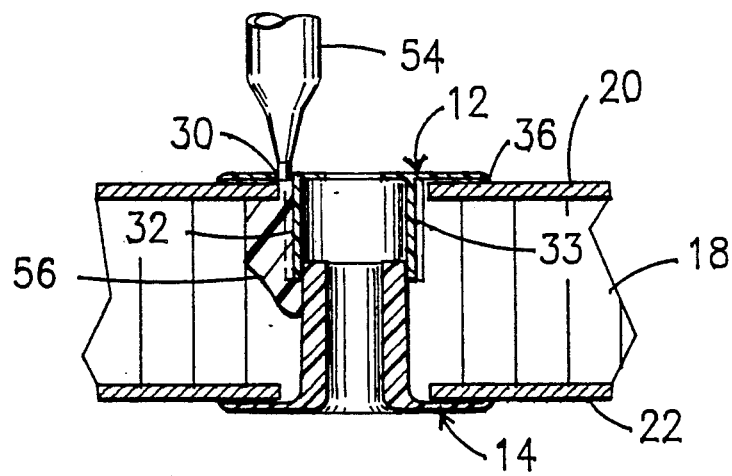
FIG. 3 is a cross-sectional view of the compression fitting being loaded with epoxy.
Figure 4:
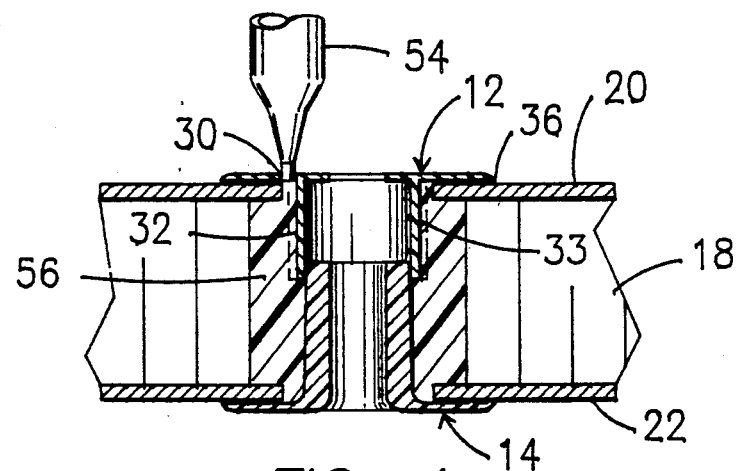
FIG. 4 is a cross-sectional view of the compression fitting encased within epoxy.
Figure 5:
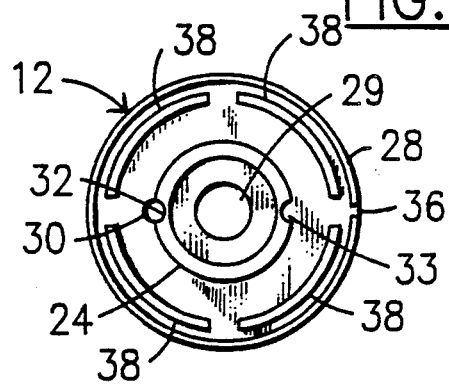
FIG. 5 is bottom plan view of the top disk of the compression fitting.
Figure 6:
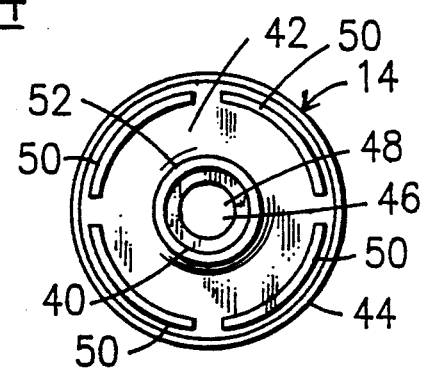
FIG. 6 is a top plan view of the bottom disk of the compression fitting.

Throughout the following detailed description, the same reference numerals refer to the same elements in all figures.

The two-component compression fitting 10 shown in FIG. 1 has a top component 12 and a bottom component 14. The top component 12 is pressed into a hole 16 in a honeycomb panel 18 from top surface 20. The bottom component 14 is pressed into hole 16 from the opposite direction from bottom surface 22 and axially engages the top component 12 within the honeycomb panel 18.

Top component 12 has a downwardly descending cylindrical tube 24 integral with a bottom surface 26 of disk 28. An eccentric hole 30 in disk 28 permits insertion of epoxy into the interior of panel 18. A vertical channel 32 along an edge of cylinder 24 is aligned at a top end with hole 30 to provide a route for the epoxy 56 down into the honeycomb panel 18. A second vertical channel 33 along an opposite side of cylinder 24 assists in the distribution of epoxy. A central bore 34 in disk 28 is contiguous with an inner channel 29 within the cylindrical tube 24. A discontinuity in an edge or a vent opening 36 in top disk 28 permits exit of air or excess epoxy when epoxy is pumped via a container 54 through hole 30 into the panel 18. Multiple ribs or ridges 38 assist in seating the compression fitting in place by retaining or trapping epoxy among the ridges 38 and sealing the disk to the top surface 20 of the honeycomb panel 18.

Bottom component 14 has an upwardly ascending cylindrical tube 40 integral with a top surface 42 of disk 44. A central bore 46 in disk 44 is contiguous with an inner channel 48. Multiple ribs or ridges 50 assist in seating the bottom component 14 in place by sealing the disk 44 to the bottom surface 22 of the honeycomb panel 18.

The exterior diameter of cylindrical tube 40 is slightly smaller than the interior diameter of cylindrical tube 24 so that the two cylindrical tubes are engaged together when the compression fitting is properly seated in a honeycomb panel. A radius 52 along a circular arc where the cylindrical tube 40 is integral with surface 42 prevents tube 40 from being inserted too far into channel 29.

The components 12 and 14 can be made by injection molding from a high strength plastic such as reinforced polyvinyl chloride, polyetherimide, DELRIN ® or CELCON ®. ULTEM ® polyetherimide is preferred. The compression fitting 10 provides a reinforced channel through the honeycomb panel for receipt of a through bolt fastener or other fastener element.

The compression fitting of this invention is adjustable over a wide range of variation in honeycomb panel thickness and seals to both surfaces of the honeycomb panel.

Having thus described the invention, what is claimed and desired to be secured by Letters Patent is:

1. A two-component compression fitting for use in a two-sided honeycomb panel comprising a top disk having a central bore and a descending cylindrical tube integral with a bottom surface of the top disk, an exterior side wall of the cylindrical tube having a vertical channel contiguous with an eccentric hole in the top disk and an inner wall of the cylindrical tube contiguous with the central bore in the top disk;

a bottom disk having a central bore and an ascending cylindrical tube integral with a top surface of the bottom disk, an exterior diameter of the ascending cylindrical tube being slightly narrower than an inside diameter of the descending cylindrical tube so that the ascending cylindrical tube axially engages the descending cylindrical tube when the two components of the compression fitting are pressed together from opposite sides of the two-sided honeycomb panel.

2. A two-component compression fitting according to claim 1, wherein there is a raised radius between the top surface of the bottom disk and the exterior diameter of the ascending cylindrical tube at a point of joinder.

3. A two-component compression fitting according to claim 1, wherein the bottom surface of the top disk and the top surface of the bottom disk have multiple ridges spaced from an edge of each disk to bond to opposite sides of the honeycomb panel after receipt of an epoxy sealer.

4. A two-component compression fitting according to claim 1, wherein the top disk has a notch on an edge of the disk to permit overflow of an epoxy sealer injected into the honeycomb panel.

5. The two-component compression fitting according to claim 4, wherein the eccentric hole in the top disk is adapted to receive epoxy, and the channel in the top disc cylindrical tube is adapted to provide a route to distribute the epoxy within the honeycomb panel.

* * * * *